(12) United States Patent
Jung et al.

(10) Patent No.: US 9,681,085 B2
(45) Date of Patent: Jun. 13, 2017

(54) DISPLAY APPARATUS (75) Inventors: Sung Soo Jung, Suwon-si (KR); Hyun Jun Jung, Yongin-si (KR); Maeng Kyu Yuk, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 696 days.

(21) Appl. No.: 12/882,418

(22) Filed: Sep. 15, 2010

(65) Prior Publication Data

US 2011/0069055 A1 Mar. 24, 2011

(30) Foreign Application Priority Data

Sep. 22, 2009 (KR) .................. 10-2009-0089521

(51) Int. Cl.
*G06F 3/038* (2013.01)
*G09G 3/36* (2006.01)
*H04N 5/64* (2006.01)
*F16M 11/10* (2006.01)
*G06F 1/16* (2006.01)
(Continued)

(52) U.S. Cl.
CPC .............. *H04N 5/64* (2013.01); *F16M 11/10* (2013.01); *F16M 11/2021* (2013.01); *F16M 13/02* (2013.01); *G06F 1/1601* (2013.01); *F16M 2200/08* (2013.01); *G06F 2200/1612* (2013.01)

(58) Field of Classification Search
CPC .... F16M 11/10; F16M 11/2021; F16M 13/02; F16M 2200/08; G06F 1/1601; G06F 2200/1612; H04N 5/64
USPC ............... 345/102, 204, 211, 76, 206, 87; 361/679.05, 679.27, 681, 683; 248/133
See application file for complete search history.

(56) References Cited

U.S. PATENT DOCUMENTS 6,032,918 A 3/2000 Cho
6,168,124 B1 1/2001 Matsuoka et al.
(Continued)

FOREIGN PATENT DOCUMENTS

CN 1420502 5/2003
CN 1917750 A 2/2007
(Continued)

OTHER PUBLICATIONS

International Search Report mailed Jun. 27, 2011 in International Application No. PCT/KR2010/006457.
(Continued)

*Primary Examiner* — Andrew Sasinowski
*Assistant Examiner* — Kuo Woo
(74) *Attorney, Agent, or Firm* — Staas & Halsey LLP (57) ABSTRACT

Disclosed herein is a display apparatus having a slim display body to display pictures. Main components, such as a switching mode power supply and a main board, are disposed in a base unit, and a drive board mounted to a display module is connected to the switching mode power supply and the main board such that power is supplied to the display module and the main board transmits and receives a control signal. The base unit serves as a stand to support the display body below the display body. Also, the base unit is fixed to the rear of the display body to mount the display apparatus to a wall. A connection unit to connect the display body and the base unit is provided to change the position of the base unit. The connection unit is hingedly rotatable with respect to the display body and the base unit.

35 Claims, 10 Drawing Sheets (51) Int. Cl.
*F16M 11/20* (2006.01)
*F16M 13/02* (2006.01)

(56) References Cited

U.S. PATENT DOCUMENTS

| | | | |
|---|---|---|---|
| 6,268,998 B1 | 7/2001 | Cho | |
| 6,504,707 B2* | 1/2003 | Agata et al. | 361/679.05 |
| 6,515,655 B1* | 2/2003 | Thornblad | G09G 1/005 |
| | | | 345/211 |
| 6,560,124 B1 | 5/2003 | Irie et al. | |
| 7,348,959 B2* | 3/2008 | Kim | 345/102 |
| 7,598,674 B2 | 10/2009 | Jeong | |
| 7,663,576 B2 | 2/2010 | Ozaki | |
| 7,825,877 B2 | 11/2010 | Yoshida | |
| 8,166,514 B2 | 4/2012 | Doumuki | |
| 2002/0126110 A1 | 9/2002 | Bowron | |
| 2004/0012917 A1* | 1/2004 | Jung et al. | 361/681 |
| 2004/0047115 A1* | 3/2004 | Helot | F16M 11/06 |
| | | | 361/679.06 |
| 2004/0165119 A1* | 8/2004 | Choi | H04N 5/44 |
| | | | 348/839 |
| 2004/0257319 A1 | 12/2004 | Park et al. | |
| 2004/0263423 A1 | 12/2004 | Huang et al. | |
| 2004/0263495 A1 | 12/2004 | Sugino et al. | |
| 2005/0247832 A1* | 11/2005 | Cho | F16M 11/04 |
| | | | 248/133 |
| 2006/0152898 A1* | 7/2006 | Hirayama | 361/683 |
| 2006/0184974 A1 | 8/2006 | Sakao | |
| 2006/0192737 A1* | 8/2006 | Goto | G02F 1/133617 |
| | | | 345/87 |
| 2006/0203143 A1 | 9/2006 | Shin | |
| 2006/0290687 A1 | 12/2006 | Takaji et al. | |
| 2007/0222774 A1* | 9/2007 | Foster | 345/204 |
| 2007/0252827 A1 | 11/2007 | Hirota | |
| 2007/0252919 A1 | 11/2007 | McGreevy | |
| 2008/0007904 A1* | 1/2008 | Chen | F16M 11/00 |
| | | | 361/679.06 |
| 2008/0030112 A1 | 2/2008 | Lee et al. | |
| 2008/0099646 A1 | 5/2008 | Kobara | |
| 2008/0158111 A1* | 7/2008 | Sakata et al. | 345/76 |
| 2008/0174943 A1* | 7/2008 | Hirasawa et al. | 361/681 |
| 2008/0198127 A1* | 8/2008 | Decraemer | G09G 3/342 |
| | | | 345/102 |
| 2008/0284765 A1* | 11/2008 | Kim | 345/206 |
| 2009/0051674 A1 | 2/2009 | Kimura et al. | |
| 2009/0079665 A1 | 3/2009 | Moscovitch | |
| 2009/0096952 A1* | 4/2009 | Yeo | 349/59 |
| 2009/0128452 A1 | 5/2009 | Bril et al. | |
| 2010/0053140 A1 | 3/2010 | Kubota et al. | |
| 2010/0067181 A1 | 3/2010 | Bair et al. | |
| 2011/0242439 A1 | 10/2011 | Calderon et al. | |

FOREIGN PATENT DOCUMENTS

| | | |
|---|---|---|
| EP | 1790901 A2 | 5/2007 |
| EP | 1803987 | 7/2007 |
| EP | 1790901 A3 | 7/2008 |
| EP | 1939710 | 7/2008 |
| JP | 07-225633 | 8/1995 |
| JP | 2001-83902 | 3/2001 |
| JP | 2002-229464 | 8/2002 |
| JP | 2002-229676 | 8/2002 |
| JP | 2003-150068 | 5/2003 |
| JP | 2003150068 | 5/2003 |
| JP | 2003-219317 | 7/2003 |
| JP | 2005-242075 | 9/2005 |
| JP | 2006-146100 | 6/2006 |
| JP | 2006-154842 | 6/2006 |
| JP | 2008-167006 | 7/2008 |
| JP | 2008-257089 | 10/2008 |
| JP | 2012-530777 | 12/2012 |
| JP | 2013-505660 | 2/2013 |
| KR | 10-2000-0074394 | 12/2000 |
| KR | 10-2005-003219 | 1/2005 |
| KR | 1020050003219 | 1/2005 |
| KR | 20050056698 | 6/2005 |
| KR | 10-2005-0069545 | 7/2005 |
| KR | 10-2005-0105065 | 11/2005 |
| KR | 10-2006-0017061 | 2/2006 |
| KR | 10-2006-0027273 | 3/2006 |
| KR | 100782177 | 11/2007 |
| KR | 10-2008-0056824 | 6/2008 |
| KR | 10-2008-0063681 | 7/2008 |
| KR | 10-2009-0095910 | 9/2009 |
| WO | 03-056663 | 7/2003 |

OTHER PUBLICATIONS

European Search Report Issued on Jul. 26, 2012 in EP Patent Application No. 10819026.5.
Extended European Search report issued in Application No. 13156247.2 dated May 10, 2013.
Communication dated Mar. 10, 2011 issued by the European Patent Office in counterpart European Application No. 10191339.0.
Communication dated Jun. 14, 2012 issued by the European Patent Office in counterpart European Application No. 10191339.0.
Communication dated Sep. 21, 2012 issued by the Korean Intellectual Property Office in counterpart Korean Patent Application No. 10-2010-0041093.
U.S. Non-Final Office Action issued in counterpart U.S. Appl. No. 12/949,122 dated Jan. 24, 2013.
U.S. Final Office Action issued in counterpart U.S. Appl. No. 12/949,122 dated Jul. 11, 2013.
U.S. Non-Final Office Action issued in counterpart U.S. Appl. No. 13/541,230 dated Jun. 27, 2013.
U.S. Final Office Action issued in counterpart U.S. Appl. No. 13/541,230 dated Mar. 28, 2013.
U.S. Non-Final Office Action issued in counterpart U.S. Appl. No. 13/541,230 dated Oct. 26, 2012.
Chinese Office Action issued in Application No. 201080042073.7 on May 4, 2014.
Summons to attend Oral Proceedings issued in European Application No. 10191339.0 on Jan. 28, 2014.
Office Action, dated Aug. 26, 2014, in corresponding Japanese Application No. 2012-530777.
Japanese Notice of Allowance dated May 27, 2015 from Japanese Patent Application No. 2012-530777, 1 page.
European Oral Proceedings dated May 26, 2015 from European Patent Application No. 13156247.2, 5 pages.
Summons to Oral Proceedings dated Jan. 5, 2016 in European Patent Application No. 10819026.5, 4 pages.
Oral Proceedings Minutes dated Dec. 2, 2015 in European Patent Application No. 13156247.2, 5 pages.
Decision to Refuse dated Dec. 2, 2015 from European Patent Application No. 13156247.2, 15 pages.
Japanese Office Action dated Jun. 28, 2016 from Japanese Patent Application No. 2015-117889, 10 pages.
Decision to Refuse dated Jun. 17, 2016 from European Patent Application No. 10819026.5, 7 pages.
Oral Proceedings Minutes dated Jun. 17, 2016 from European Patent Application No. 10819026.5, 4 pages.
Chinese Decision of Grant dated Jan. 12, 2015 from Chinese Patent application No. 201080042073.7, 4 pages.
Japanese Office Action dated Feb. 27, 2017 from Japanese Paten Application No. 2015-117889, 9 pages.
Chinese Office Action dated Apr. 19, 2017 from Chinese Patent Application No. 201510141452.6, 8 pages.

* cited by examiner

DISPLAY APPARATUS

CROSS-REFERENCE TO RELATED APPLICATIONS

This application claims priority under 35 USC §119(a) of the benefit of Korean Patent Application No. 2009-0089521, filed on Sep. 22, 2009 in the Korean Intellectual Property Office, the disclosure of which is incorporated herein by reference.

BACKGROUND

1. Field of the Invention

Embodiments of the present general inventive concept relate to a display apparatus having a slim display body.

2. Description of the Related Art

A display apparatus is an apparatus to display images on a screen.

Generally, the display apparatus includes a display module to form pictures, a cover to cover the outside of the display module, and a stand to support the display module below the display module.

The display module includes a display panel to display pictures and various circuit components to drive the display panel.

In recent years, a design to provide users with an aesthetically pleasing appearance in addition to basic functions has been emphasized according to high-quality improvements of the display apparatus.

Thus, it is preferable that the display apparatus may be constructed to be slim in consideration of space utilization.

SUMMARY

Therefore, it is an aspect of the present general inventive concept to provide a display apparatus having a slim display body to display pictures.

Additional features and utilities of the present general inventive concept will be set forth in part in the description which follows and, in part, will be obvious from the description, or may be learned by practice of the present general inventive concept.

Embodiments of the present general inventive concept provide a display apparatus that includes a display body including a display module to form pictures and a drive board mounted at a rear of the display module, a cover unit to cover the display body, a base unit including a switching mode power supply (SMPS) to supply power to the display body and a main board to control the display body and transmit an external image signal to the display body, and a connection unit to connect the cover unit and the base unit. The drive board can be electrically connected to the SMPS and the main board, the SMPS can supply power to the display body through the drive board, and the main board can control the display module through the drive board.

The display module may include a display panel to display pictures using liquid crystals and a back light assembly to irradiate light to the display panel, and the drive board may supply power supplied from the SMPS to the back light assembly.

The display panel may include a plurality of panel drive chips to form pictures, and the drive board may include a timing controller to control the panel drive chips according to an image signal received from the main board.

The display apparatus may further include a cable unit to electrically connect the drive board and the base unit and the cable unit can extend through the connection unit.

The cable unit may include first connectors connected to the main board and the SMPS in the base unit, a second connector connected to the drive board, and a cable to connect the first connectors and the second connector, the connection unit may further include a connection plate, and the cable may be supported by the connection plate.

The connection plate may include a cable guide to prevent movement of the cable.

The base unit may be configured such that a position of the base unit is changed between a first position in which the base unit supports the cover unit below the cover unit and a second position in which the base unit is fixed to a rear of the cover unit.

The display apparatus may further include a neck cover to maintain the first position.

The position of the base unit may be changed from the first position to the second position by removing the neck cover, folding the connection unit, and fixing the base unit to the rear of the cover unit such that the display body, the connection unit, and the base unit are disposed in parallel.

The display body may further include a display body bracket, the base unit may further include a base bracket, and the connection unit may further include a first hinge to hingedly connect the display body bracket to one end of the connection plate such that the cover unit and the connection unit are hingedly rotatable relative to each other and a second hinge to hingedly connect the base bracket to the other end of the connection plate such that the base unit and the connection unit are hingedly rotatable relative to each other.

The second connector may be coupled to a rear of the drive board.

The base unit may further include at least one speaker to output a sound signal received from the main board.

The connection unit may further include a front plate cover to cover the front of the first hinge, the second hinge, and the connection plate and a rear plate cover to cover the rear of the first hinge, the second hinge, and the connection plate.

The neck cover may partially cover the connection unit, the cover unit, and the base unit.

The base unit may be fixed to the rear of the cover unit through screw coupling at the second position.

The SMPS may include a power terminal to which an external power cable is connected, and the main board may include an input signal terminal unit connected to an external signal source.

Embodiments of the present general inventive concept further provide a display apparatus that includes a display body including a display module to form pictures and a drive board mounted at a rear of the display module, a cover unit to cover the display body, a base unit including an SMPS to supply power to the display body and a main board to control the display body; the base unit being disposed outside the cover unit. The drive board can be electrically connected to the SMPS and the main board to supply power to the display module and control the display module, and the base unit may be configured to have different positions.

The positions of the base unit may include a stand position in which the base unit supports the cover unit below the cover unit to serve as a stand and a wall mount position in which the base unit is fixed to a rear of the cover unit to mount the display apparatus to a wall.

The display apparatus may further include a connection unit to connect the cover unit and the base unit, and the connection unit may be configured to be hingedly rotatable relative to the cover unit and the base unit.

The position of the base unit may be changed from the stand position to the wall mount position by folding the connection unit.

Embodiments of the present general inventive concept further include a display apparatus including a display body to display images thereon including a display screen; a base unit to control images on the display screen and supply power to the display body through at least one cable unit; and a connection unit to rotatably connect the display body with the base unit including a cable guide to eliminate twisting of the at least one cable unit, such that the base unit is configured to support the display apparatus in different positions.

Embodiments of the present general inventive concept further include a display apparatus including a display body including a display screen with a first surface to form images and a drive board mounted on a surface of the display screen opposite behind the first surface; a base unit including an SMPS to supply power to the display body; and a main board to control the display body; and a connection unit to rotatably connect the base unit with an external surface of the display body, such that the drive board is electrically connected to the SMPS and the main board, and the base unit is configured to support the display body in different positions.

BRIEF DESCRIPTION OF THE DRAWINGS

Embodiments of the present general inventive concept will become apparent and more readily appreciated from the following description of the exemplary embodiments, taken in conjunction with the accompanying drawings, in which.

DETAILED DESCRIPTION OF THE EXEMPLARY EMBODIMENTS

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 1:
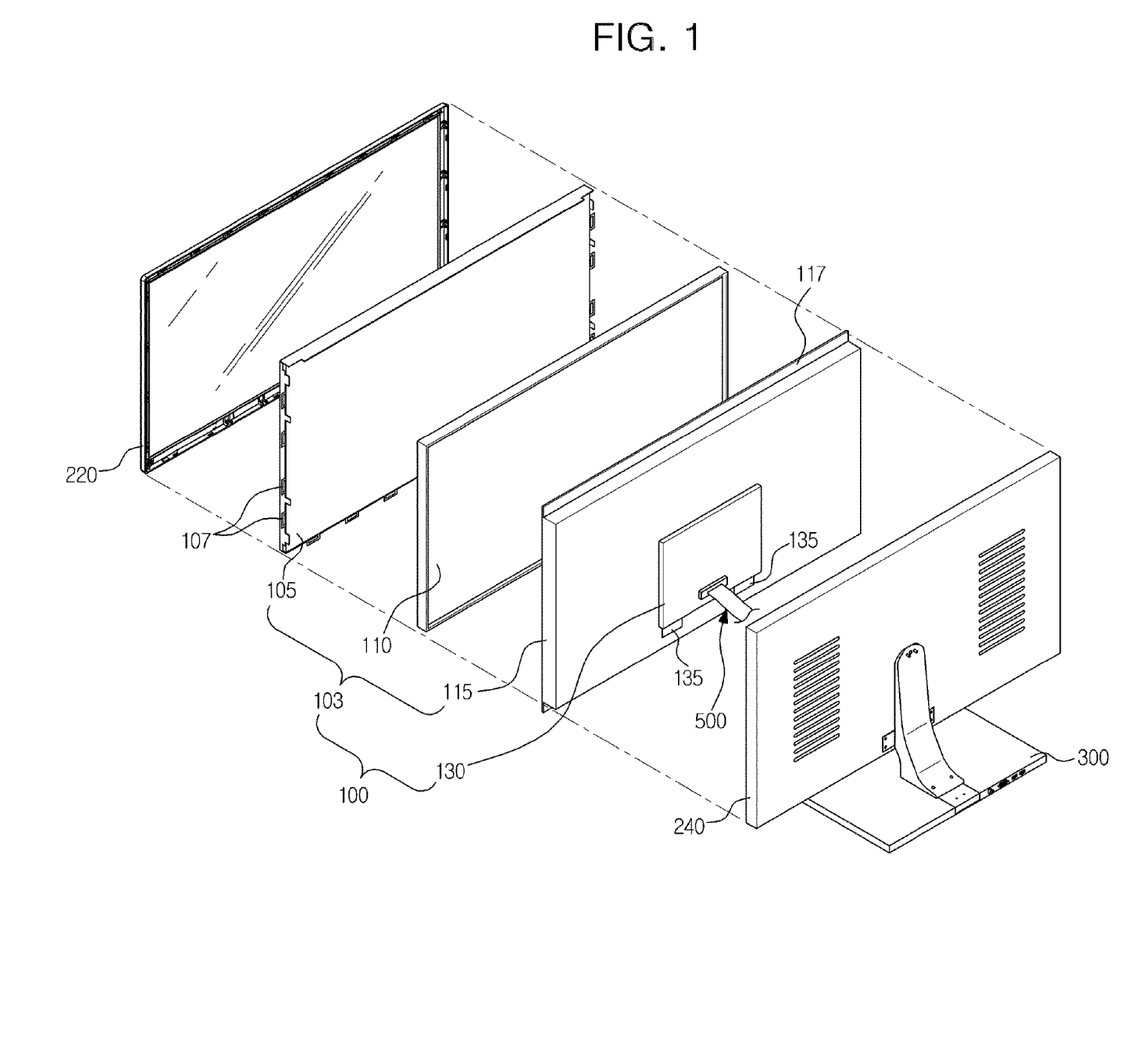
FIG. 1 is a rear perspective view illustrating a display apparatus according to an exemplary embodiment of the present general inventive concept.
Figure 2:
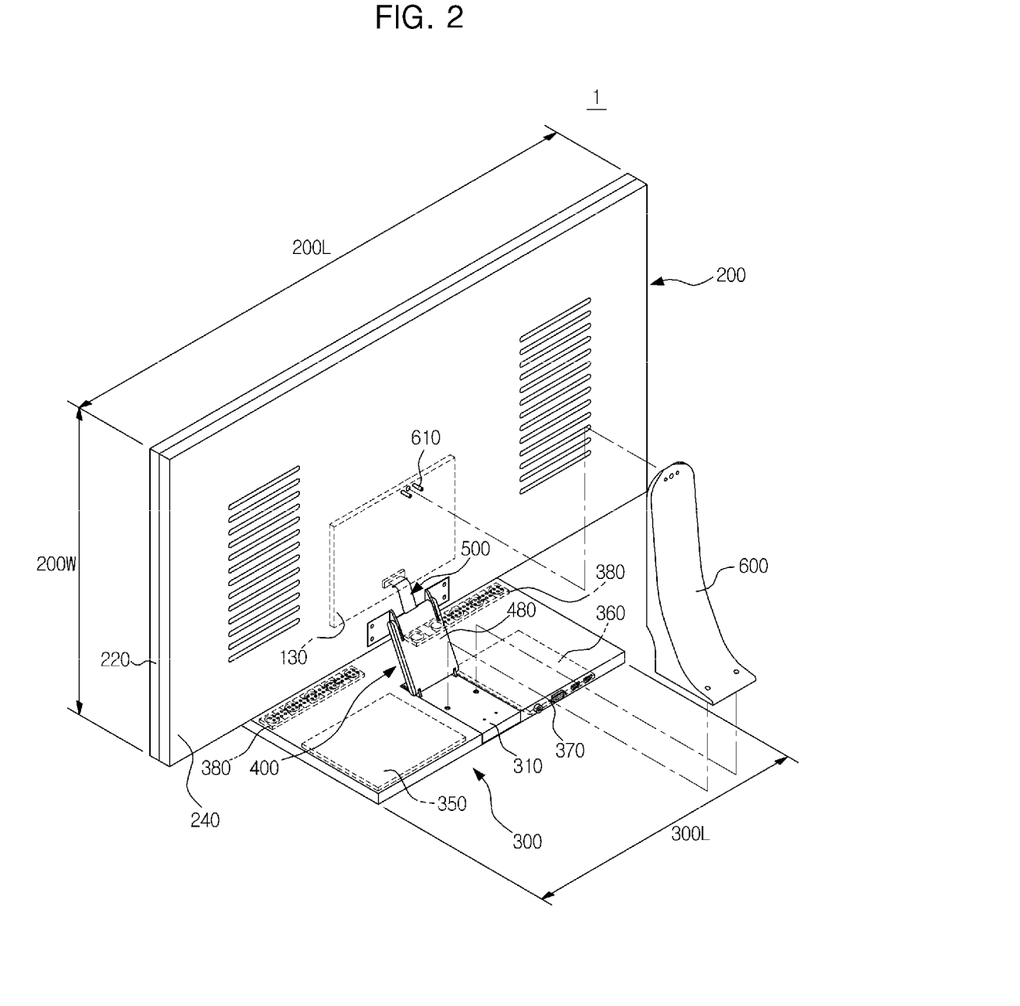
FIG. 2 is an exploded perspective view of the display apparatus of FIG. 1 with a neck cover separated.
Figure 3:
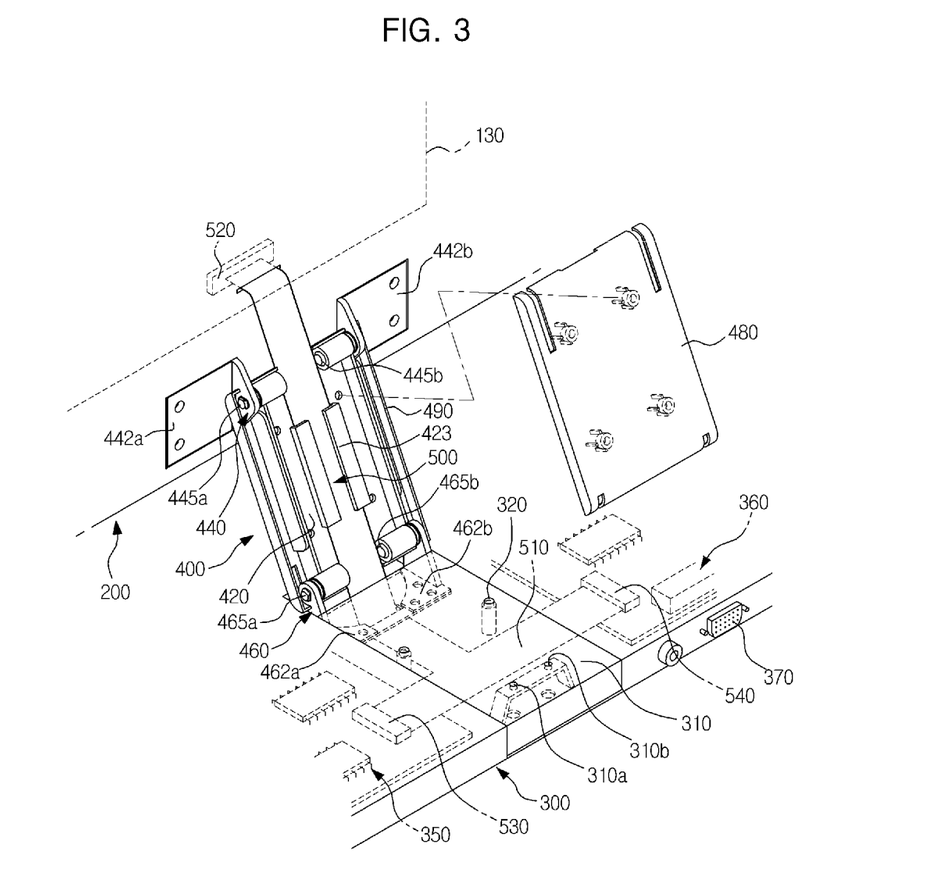
FIG. 3 is an enlarged exploded perspective view of a connection unit of FIG. 2.

FIG. 1 is a rear perspective view illustrating a display apparatus 1 according to an exemplary embodiment of the present general inventive concept, FIG. 2 is an exploded perspective view of the display apparatus 1 of FIG. 1 with a neck cover separated, and FIG. 3 is an enlarged exploded perspective view of a connection unit of FIG. 2.

As illustrated in FIGS. 1 to 3, the display apparatus 1 can include a display body 100, a cover unit 200 to cover the front and rear of the display body 100, a base unit 300 having a switching mode power supply (SMPS) 350 and a main board 360 mounted therein, and a connection unit 400 to connect the cover unit 200 and the base unit 300. The display apparatus 1 may be used as, for example, a television, monitor, video display, entertainment system, or portable terminal, or the like. The display body 100 may be movable with respect to a reference, for example, the base unit 300 in at least one direction, at different positions, or to provide a user (viewer) with one or more viewing angles.

The display body 100 can include a display module 103 to form pictures and a drive board 130 mounted at the rear of the display module 103.

The display module 103 can include a display panel 105 to display pictures, a back light assembly 115 to irradiate light to the display panel 105, and an optical panel 110 to uniformalize the light irradiated from the back light assembly 115.

The display panel 105 can display pictures using properties of liquid crystals arranged according to an electrical signal. The display panel 105 can include a plurality of panel drive chips 107 provided at the edge thereof to form pictures. The panel drive chips 107 can serve to form, for example, letters or images on the display panel 105. The panel drive chips 107 can receive an image signal from a timing controller of the drive board 130 and transmit the image signal to the display panel 105.

Figure 10:
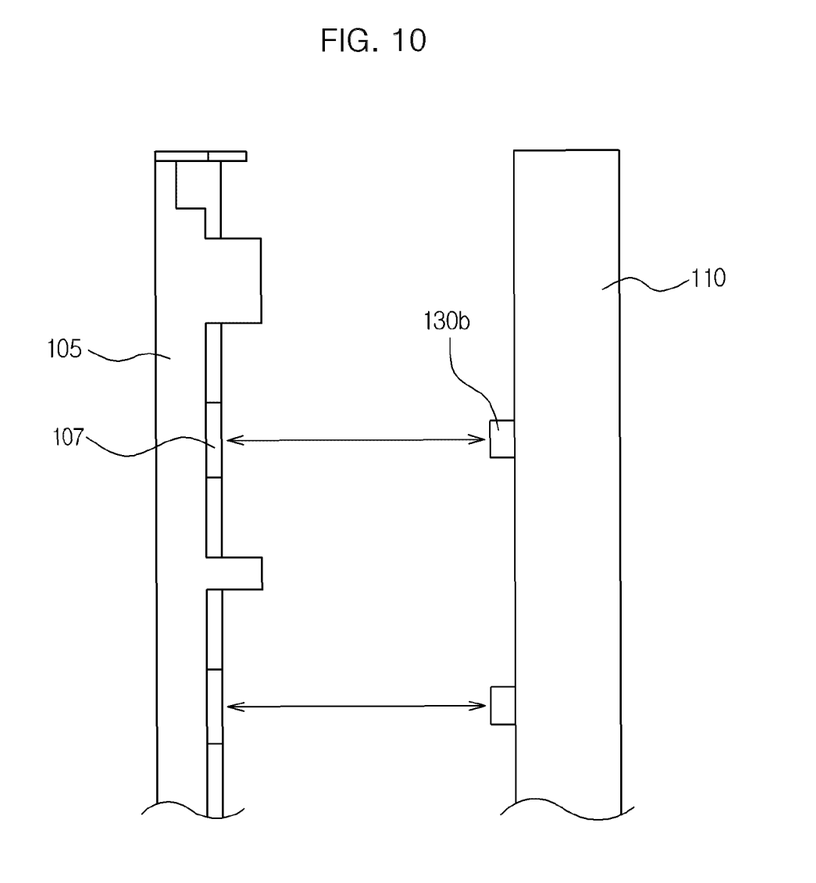
FIG. 10 is an enlarged view of the optical panel connecting with the display panel.

Communication between the plurality of panel drive chips 107 and at least one second connecting element 130b on the optical panel 110 is illustrated in FIG. 10.

Meanwhile, the display panel 105, which is of a non-emissive type, can display images by the provision of the back light assembly 115 to irradiate light to the display panel 105.

The back light assembly 115 can include a chassis 117, a reflection panel (not illustrated) provided inside the chassis 117, and light sources (not illustrated) to emit light. The chassis 117 can constitute the overall appearance of the back light assembly 115. The reflection panel can reflect light emitted from the light sources to the display panel 105 so as to improve light emission efficiency.

The light sources can be provided above the reflection panel of the chassis 117. The light sources emit light such that a user can recognize pictures displayed on the non-emissive type display panel 105. The light sources can be arranged at regular intervals. Cold cathode fluorescent lamps (CCFLs) or light emitting diodes (LEDs) may be used as the light sources.

Also, the light sources may be of a direct light type in which light is directly irradiated to the display panel 105 or of an edge light type in which the light sources are disposed at the side of a light guide panel, light emitted from the light sources is refracted and diffused along the light guide panel, and the refracted and diffused light is irradiated to the display panel 105.

The optical panel 110 can be disposed between the back light assembly 115 and the display panel 105 to allow light emitted from the light sources to be uniformly irradiated to the display panel 105. The optical panel 110 can be provided with a condensing sheet to change a light path perpendicularly to the display panel 105, a diffusion panel to diffuse light emitted from the light sources, and a refraction panel to refract and scatter light.

The drive board 130 can mount to the rear of the display module 103. The drive board 130 can electrically connect to the SMPS 350 and the main board 360 of the base unit 300. The drive board 130 can serve to supply power to the display module 103 and control the display module 103. The drive board 130 will be described later in connection with the SMPS 350 and the main board 360 of the base unit 300.

The cover unit 200 can include a front cover 220 to cover the front edge of the display body 100 and a rear cover 240 to cover the rear of the display body 100. The front cover 220 and the rear cover 240 can constitute a portion of the external appearance of the display apparatus 1. Predetermined design and colors may be added to the cover unit 200 so as to provide a user with an aesthetically pleasing appearance.

Figure 4:
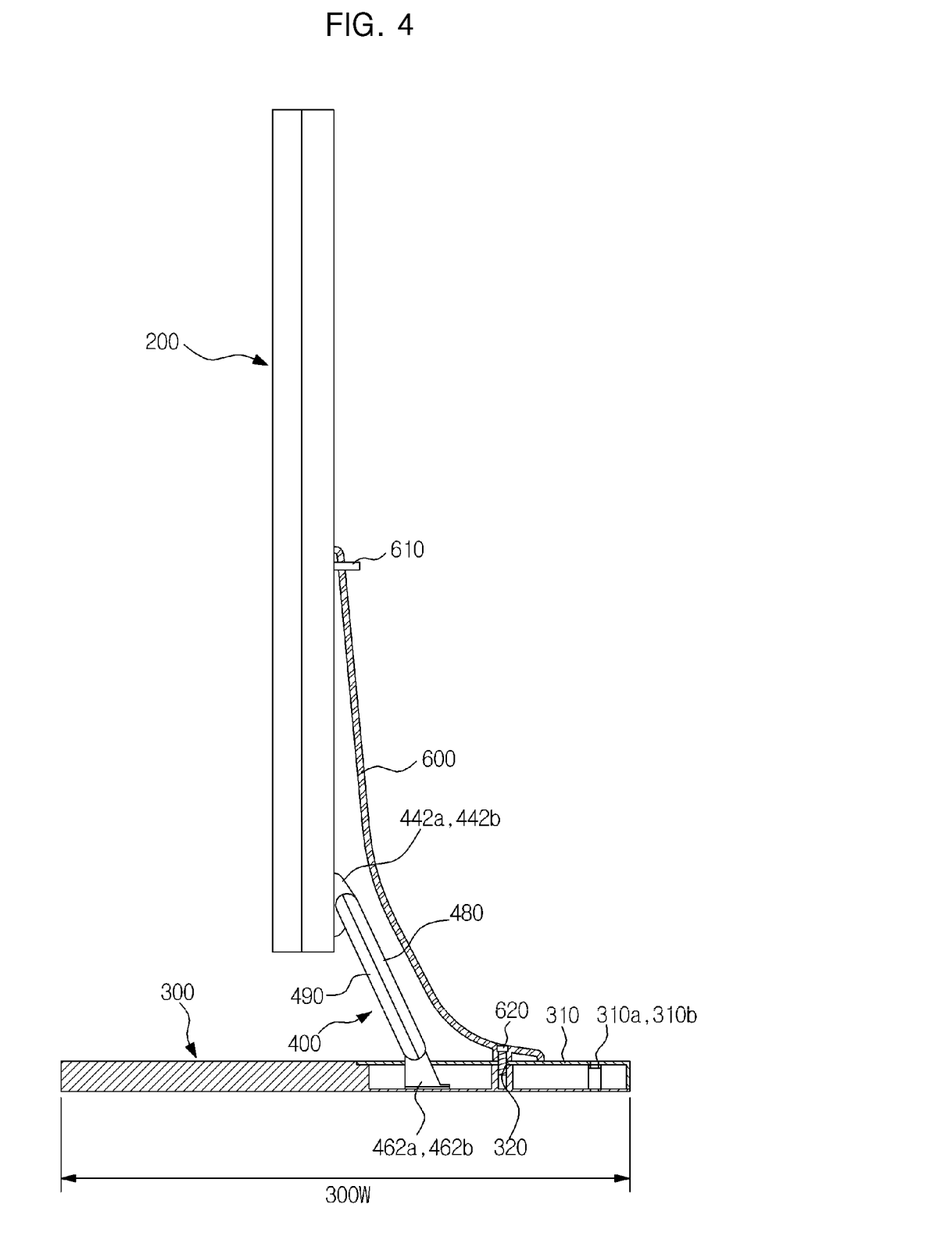
FIG. 4 is a side view of the display apparatus in a state in which a base unit is located at a first position.

As illustrated in FIG. 2, the cover unit 200 has a length 200L and width 200W. The base unit 300 has a length 300L and a width 300W, as illustrated in FIGS. 2 and 4.

The base unit 300 can be configured in the form of a plate. The base unit 300 can include main circuit components to operate the display body 100, such that the display module 103 displays pictures. The base unit 300 can cooperate with the drive board 130 to serve as a drive unit to drive the display apparatus 1.

The SMPS 350 to supply power to the display apparatus 1, the main board 360 to control the display apparatus 1, and speakers 380 to generate a sound can be mounted in the base unit 300.

The SMPS 350 can supply power to operate the display apparatus 1. The SMPS 350 can mount at one side in the base unit 300. The SMPS 350 is provided with a power terminal (not illustrated) to which an external power cable is connected.

The main board 360 can control the display apparatus 1. The main board 360 can transmit and receive a control signal to control components of the display apparatus 1. The main board 360 can mount at a side other than the side in which the SMPS 350 is mounted. The main board 360 can provide an input signal terminal unit 370 to connect with various external signal sources. The input signal terminal unit 370 may include a USB terminal for data communication with external equipment, an HDMI terminal, and various other connection terminals. The base unit 300 may include circuitry to control signals as well as memory devices and processors. For example, the base unit 300 may include a microprocessor to control data transmission to control components of the display apparatus 1.

The speakers 380 can serve to receive a sound signal from the main board 360 and generate a sound. The speakers 380 can be disposed in the base unit 300 at the front side thereof.

The cover unit 200 and the base unit 300 are connected to each other by the connection unit 400.

The connection unit 400 can include a connection plate 420, a first hinge 440 to rotatably connect the cover unit 200 and the connection plate 420, and a second hinge 460 to rotatably connect the base unit 300 and the connection plate 420.

The connection plate 400 can be connected between the cover unit 200 and the base unit 300 in a hinged rotatable manner.

The first hinge 440 can couple the cover unit 200 and the connection plate 420. Display body brackets 442a and 442b mounted to the rear of the cover unit 200 are connected to the connection plate 420 via first hinge shafts 445a and 445b such that the first hinge 440 can rotate about the first hinge shafts 445a and 445b.

The second hinge 460 can couple the base unit 300 and the connection plate 420. Base brackets 462a and 462b mounted in the base unit 300 are connected to the connection plate 420 via second hinge shafts 465a and 465b such that the second hinge 460 can rotate about the second hinge shafts 465a and 465b.

The connection unit 400 may include plate covers 480 and 490 to cover the first hinge 440, the second hinge 460, and the connection plate 420.

The plate covers 480 and 490 may include a front plate cover 480 to cover the front of the first hinge 440, the second hinge 460, and the connection plate 420 and a rear plate cover 490 to cover the rear of the first hinge 440, the second hinge 460, and the connection plate 420.

The front plate cover 480 and the rear plate cover 490 can couple to each other through the connection plate 420 disposed therebetween.

The SMPS 350, the main board 360, and the drive board 130 can electrically connect to one another via a cable unit 500.

The cover unit 200 and the base unit 300 can structurally connect to each other by the connection unit 400, whereas the display module 103 can electrically connect to the SMPS 350 and the main board 360 in the base unit 300 via the drive board 130.

The cable unit 500 can include a cable 510 and connectors 520, 530, and 540.

The first connectors 530 and 540 can fit in the main board 360 and the SMPS 350 within the base unit 300. The second connector 520 can fit in the drive board 130. The connectors 520, 530, and 540 can connect to one another via the cable 510. The connection among the drive board 130, the SMPS 350, and the main board 360 may be achieved using the single cable 510, as illustrated in FIG. 3. Alternatively, the connection between the drive board 130 and the SMPS 350, the connection between the SMPS 350 and the main board 360, and the connection between the main board 360 and the drive board 130 may be separately achieved using a plurality of cables.

Figure 9:
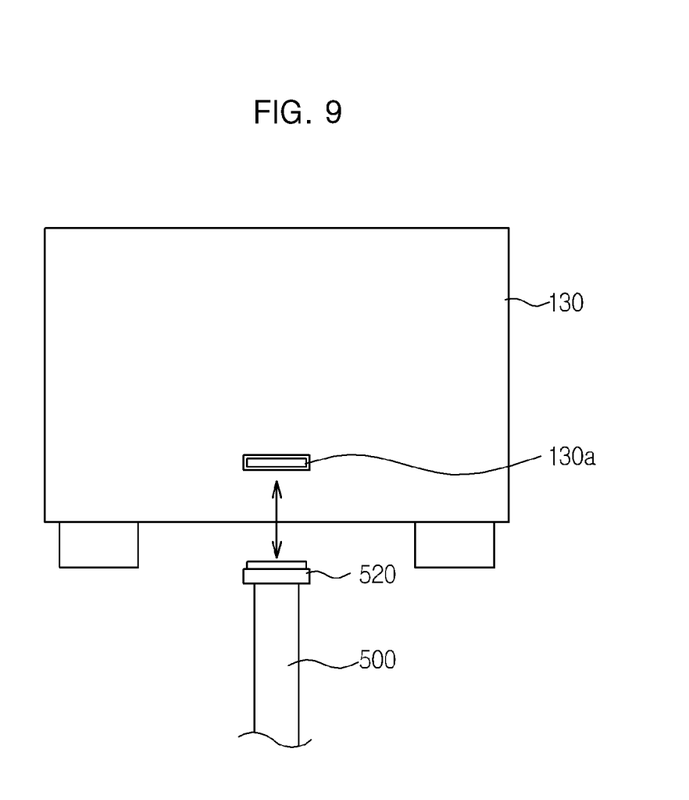
FIG. 9 is an enlarged view of the drive board connecting with the cable unit.

FIG. 9 illustrates the connection between second connector 520 of the cable unit 500 and a first connecting element 130a of the drive board 130.

The movement of the cable 510 of the cable unit 500 may be prevented by a cable guide 423 provided at the connection plate 420. Also, the cable 510 can be supported by the connection cable 420. As will be described later, the position of the base unit 300 may be changed, and the connection unit 400 may be folded accordingly. As a result, the cable 510 may move or may be disconnected. For this reason, the cable guide 423 can be provided at the top of the connection plate 420 to cover the edge of the cable 500.

Also, the second connector 520 can fit in the drive board 130 not through the bottom thereof but through the rear thereof. With this structure, a disconnection between the drive board 130 and the cable unit 500 can be prevented when the positions of the connection unit 400 and the base unit 300 are changed.

The main board 360 can transmit various kinds of image information and data to the drive board and a control signal to the SMPS 350 to control the supply of power to the display apparatus 1.

The timing controller (not illustrated), included in the drive board 130, can transmit image information received from the main board 360 to the panel drive chips 107. Upon receipt of the image information, the panel drive chips 107 can form letters and images on the display panel 105. The timing controller can serve to adjust the amount of data to be transmitted to the panel drive chips 107 of the display panel 105 and to improve picture quality. The transmission of image information to the panel drive chips 107 can be achieved through chip terminals 135 disposed at the lower side of the drive board 130.

The SMPS 350 can supply power to the drive board 130 according to a control signal from the main board 360. The drive board 130 can transmit the power to the display module 103. As a result, the power can be to the light sources of the back light assembly 115. Also, the power can be supplied to the panel drive chips 107 and various other components.

Since the SMPS 350 and the main board 360 can be located in the base unit 300, the drive board 130 serves to supply power to the display module 103 in addition to functioning as the timing controller.

The base unit 300 can be positioned a first position in which the base unit 300 supports the cover unit 200 below the cover unit 200. In this case, the display apparatus 1 includes a detachable neck cover 600 to maintain the first position (see FIGS. 1 and 2).

The neck cover 600 can serve to maintain the first position while covering the connection unit 400, the cover unit 200, and the part 310 of the base unit 300. That is, the neck cover 600 can maintain the positional relations among the cover unit 200, the connection unit 400, and the base unit 300.

Hereinafter, positions of the base unit and a process of changing the positions of the base unit according to an exemplary embodiment of the present general inventive concept will be described.

Figure 5:
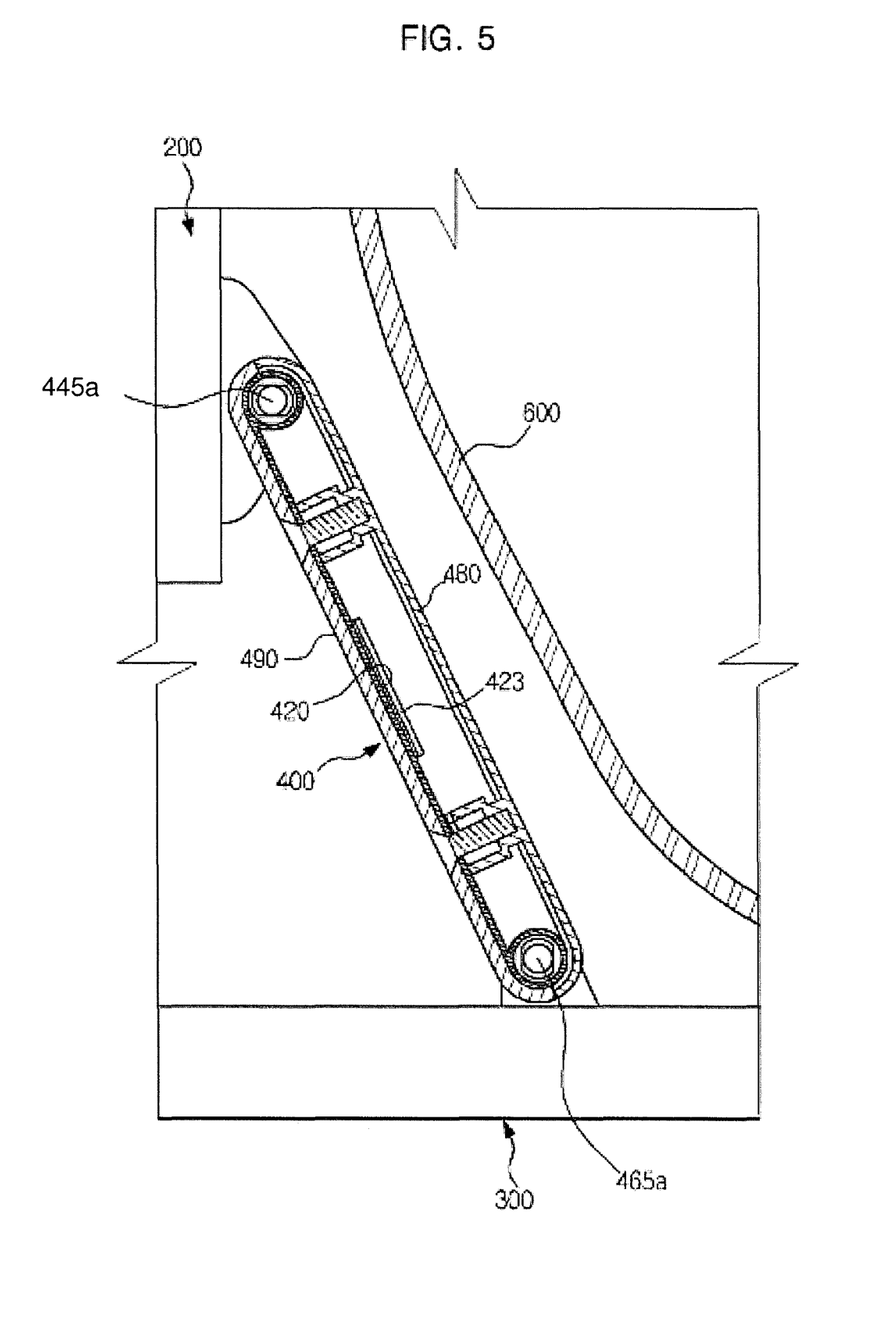
FIG. 5 is an enlarged sectional view of the connection unit of FIG. 4.
Figure 6:
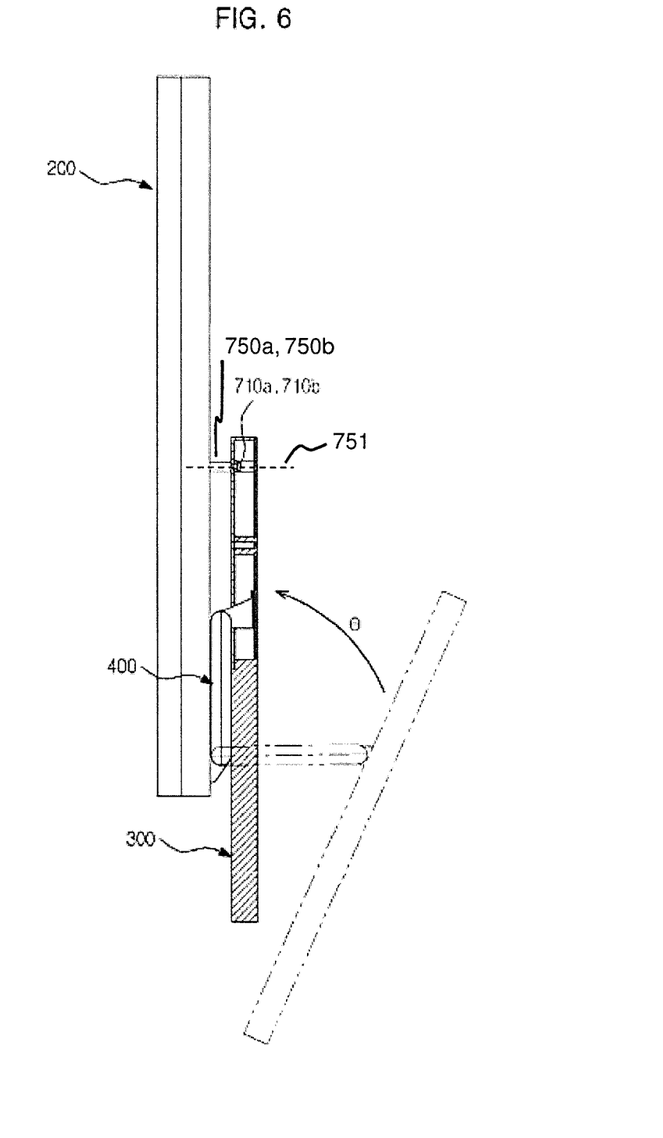
FIG. 6 is a side view illustrating a process of changing the position of the base unit from the first position to a second position.
Figure 7:
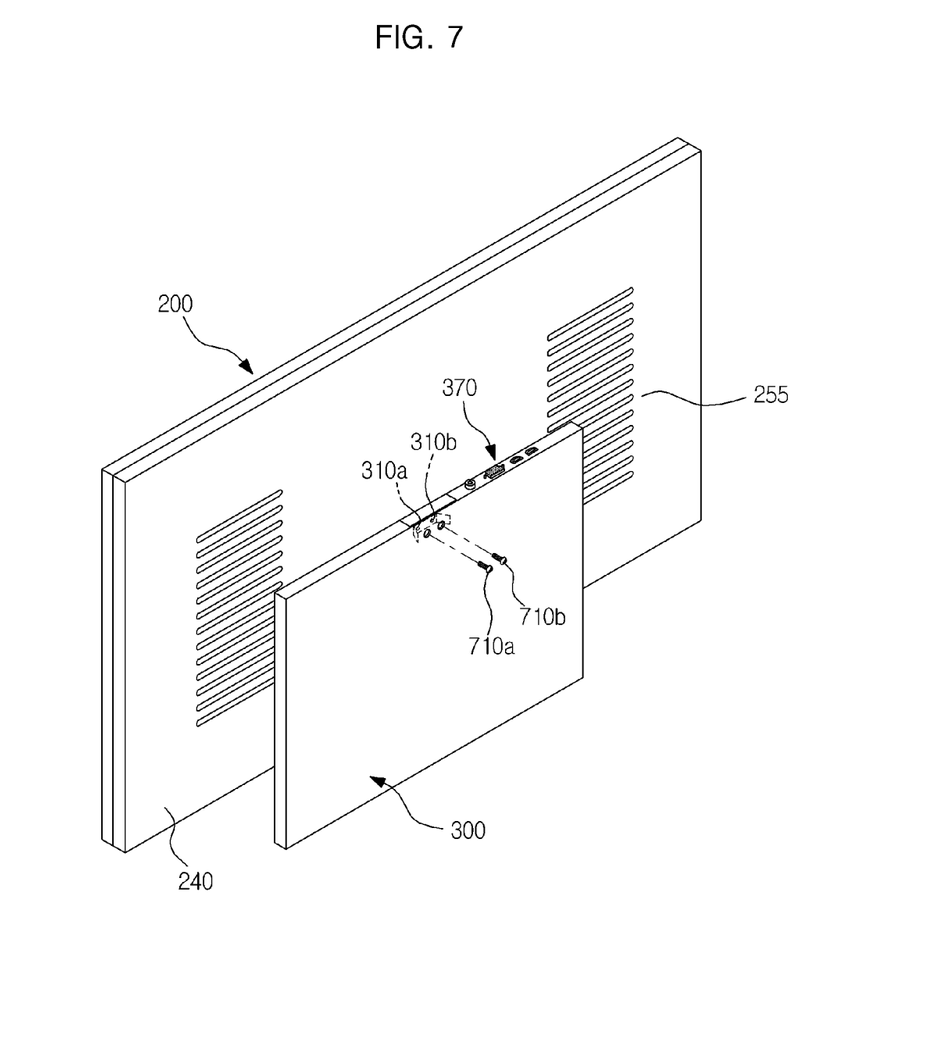
FIG. 7 is a rear perspective view of the display apparatus in a state in which the base unit is located at the second position.
Figure 8:
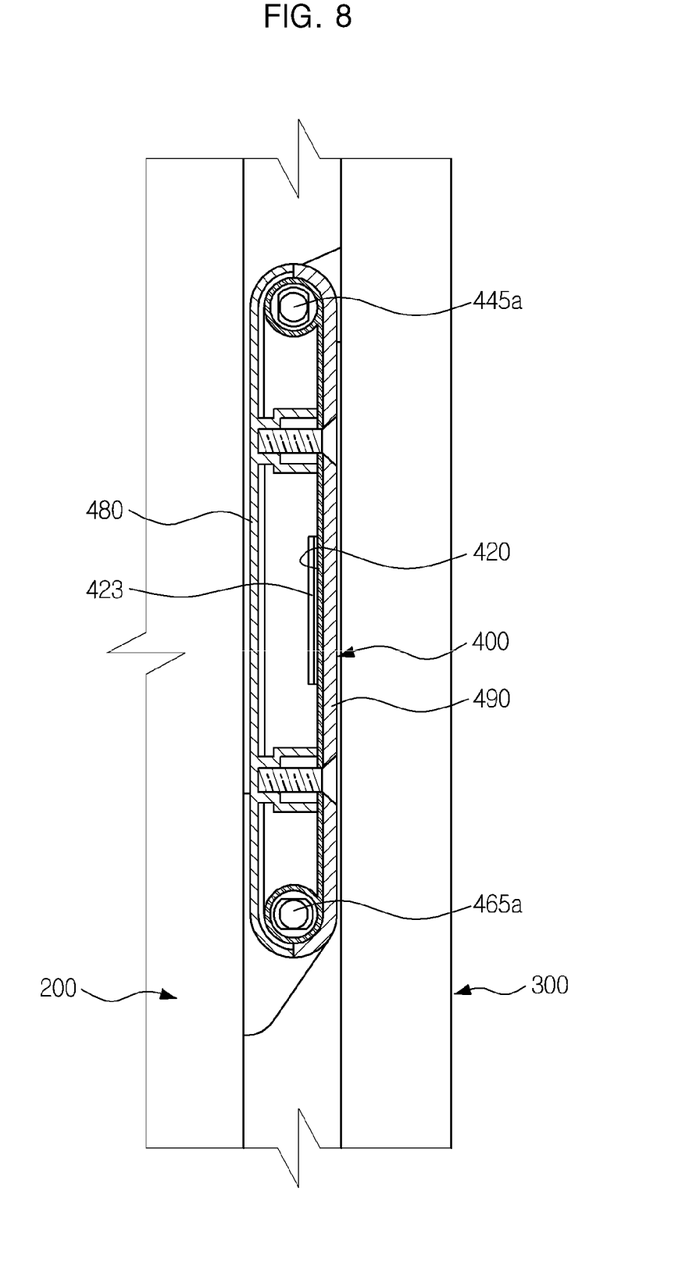
FIG. 8 is an enlarged sectional view of the connection unit of FIG. 7.

FIG. 4 is a side view of the display apparatus in a state in which the base unit is located at a first position, FIG. 5 is an enlarged sectional view of the connection unit of FIG. 4, FIG. 6 is a side view illustrating a process of changing the position of the base unit from the first position to a second position, wherein the angle of rotation ⊖ of the base unit is also illustrated, FIG. 7 is a rear perspective view of the display apparatus in a state in which the base unit is located at the second position, and FIG. 8 is an enlarged sectional view of the connection unit of FIG. 7.

As illustrated in FIGS. 4 and 5, the base unit 300 can support the cover unit 200 via the connection unit 400 below the cover unit 200 when the base unit 300 is located at the first position. The neck cover 600 can maintain such a supported state.

The upper part of the neck cover 600 can couple to the rear of the cover 200 by upper fixing screws 610, and the lower part of the neck cover 600 can couple to the top of the base unit 300 by lower fixing screws 620. More specifically, the lower fixing screws 620 are connected to lower fixing screws mounting 320 of base unit 300.

The neck cover 600 can cover the connection unit 400, the cover unit 200, and the part 310 of the base unit 300. Also, the neck cover 600 can serve to decorate the rear of the display apparatus 1.

The first position may be a stand position in which the base unit 300 serves as a stand to support the display body 100.

The position of the base unit 300 can be changed from the first position to a second position as illustrated in FIGS. 7 and 8.

First, the neck cover 600 can separate from the display apparatus 1 by loosening the upper fixing screws 610 and the lower fixing screws 620.

Subsequently, the connection unit 400 can be rotatably pushed in the rear direction of the cover unit 200 such that the connection unit 400 is hingedly rotatable, and the base unit 300 is hingedly rotatable in the direction opposite to the hinged rotation direction of the connection unit 400 such that the base unit 300 comes into tight contact with the rear of the cover unit 200. That is, the connection unit 400 can fold such that the base unit 300 tightly contacts the cover unit 200.

At this time, the hinged rotation and folding of the connection unit 400 and the base unit 300 can be smoothly achieved by the first hinge 440 and the second hinge 460.

In a state in which the base unit 300 is in tight contact with the rear of the cover unit 200, the base unit 300 can fix to the cover unit 200 by screws 710a and 710b. More specifically, the screws 710a and 710b can be fixed to the cover unit 200 by inserting through the holes 310a and 310b through respective spacer members 750a, 750b having a longitudinal axis 751.

As a result, the base unit 300 can be located at the second position in which the base unit 300 is fixed to the rear of the cover unit 200. In the second position, the bottom of the base unit 300 may be fixed to a wall, whereby the display apparatus 1 is mounted to the wall. Alternatively, the display apparatus 1 may be mounted to the wall using a wire (not illustrated). In this case, the base unit 300 can be provided at the bottom thereof with wire fixing parts. The wire can be fixed to the wire fixing parts, and the wire is hung on a wire hook formed at the wall. As a result, the display apparatus 1 is mounted to the wall. Technology for mounting the display apparatus 1 to the wall is a conventional art, and therefore, a detailed description thereof is omitted.

At the second position, the display apparatus 1 can mount to the wall through the base unit 300. At this time, the position of the base unit 300 is a wall mount position.

A minimum number of components to display pictures can be disposed in the display body 100, and other main components, such as the SMPS 350, the main board 360, and the speakers 380, can be disposed in the base unit 300. As a result, the display body 100 becomes slim.

Also, the connection unit 400 may be disposed between the display body 100 and the base unit 300 such that the base unit 300 can serve as a stand to support the display body 100 at the first position, and the display apparatus 1 can mount to the wall through the base unit 300 at the second position.

Furthermore, as illustrated in FIG. 7, ventilation slots 255 may be cut into the rear cover 240 of the cover unit 200 to facilitate with cooling of the display apparatus.

As is apparent from the above description, the number of components disposed in the display body of the display apparatus to display pictures can be minimized, thereby achieving slimness of the display body.

Also, the display apparatus can provide an aesthetically pleasing appearance through the slimness of the display body.

Although a few exemplary embodiments of the present general inventive concept have been illustrated and described, it would be appreciated by those skilled in the art that changes may be made in these exemplary embodiments without departing from the principles and spirit of the present general inventive concept, the scope of which is defined in the claims and their equivalents.

What is claimed is:
1. A display apparatus comprising:
a display body comprising:
   a display module to form pictures on a front of the display module; and
   a drive board mounted at a rear of the display module disposed opposite the front of the display module;
a cover to cover at least a portion of a rear of the display body;
a base configured such that a position of the base is changeable between a first position in which the base supports the cover below the cover and a second position in which the base is fixed to a rear of the cover, the base comprising:
   a switching mode power supply (SMPS) to supply power to the display body; and
   a main board to control the display body and transmit an external image signal to the display body;
a connection unit to connect the cover to an upper side of the base, the connection unit comprising a connection plate;
a cable unit to electrically connect the drive board and the base, the cable unit extending through the connection unit, the cable unit comprising:
   first connectors connected to the main board and the SMPS in the base, a second connector connected to the drive board, and a cable supported by the connection plate and configured to connect the first connectors and the second connector; and
a neck cover to maintain the first position,
wherein
the drive board is electrically connected to the SMPS and the main board, the SMPS supplies power to the display body through the drive board, and the main board controls the display module through the drive board, and
the position of the base is changeable from the first position to the second position by removing the neck cover, folding the connection unit, and fixing the base to the rear of the cover such that the display body, the connection unit, and the base are disposed in parallel.

2. The display apparatus according to claim 1, wherein the display module comprises:
a display panel to display pictures using liquid crystals and a back light assembly to irradiate light to the display panel; and
the drive board supplies power supplied from the SMPS to the back light assembly.

3. The display apparatus according to claim 2, wherein the display panel comprises:
a plurality of panel drive chips to form pictures; and
the drive board comprises:
a timing controller to control the panel drive chips according to an image signal received from the main board.

4. The display apparatus according to claim 1, wherein the connection plate comprises:
a cable guide to prevent movement of the cable.

5. The display apparatus according to claim 1, wherein the display body further comprises:
a display body bracket;
the base further comprises a base bracket; and
the connection unit further comprises:
   a first hinge to hingedly connect the display body bracket to one end of the connection plate such that the cover and the connection unit are hingedly rotatable relative to each other; and
   a second hinge to hingedly connect the base bracket to the other end of the connection plate such that the base and the connection unit are hingedly rotatable relative to each other.

6. The display apparatus according to claim 1, wherein the second connector is coupled to a rear of the drive board.

7. The display apparatus according to claim 1, wherein the base further comprises:
at least one speaker to output a sound signal received from the main board.

8. The display apparatus according to claim 5, wherein the connection unit further comprises:
a front plate cover to cover the front of the first hinge, the second hinge, and the connection plate and a rear plate cover to cover the rear of the first hinge, the second hinge, and the connection plate.

9. The display apparatus according to claim 1, wherein the neck cover partially covers the connection unit, the cover, and the base.

10. The display apparatus according to claim 1, wherein the base is fixed to the rear of the cover through screw coupling at the second position.

11. The display apparatus according to claim 1, wherein the SMPS comprises:
a power terminal to which an external power cable is connected, and
the main board comprises:
an input signal terminal connected to an external signal source.

12. The display apparatus according to claim 1, wherein:
the SMPS is disposed on a first side of the base and the main board is disposed on a second side of the base, and
a portion of the connection unit connected to the base is disposed between the SMPS and the main board and includes at least one cable which connects the drive board, SMPS and main board to one another.

13. A display apparatus comprising:
a display body comprising:
   a display module to form pictures at a front of the display module; and
   a drive board mounted at a rear of the display module disposed opposite the front of the display module;
a cover to cover at least a portion of a rear of the display body;
a base comprising:
   a switching mode power supply (SMPS) to supply power to the display body and a main board to control the display body, the base being disposed outside the cover, wherein the drive board is electrically connected to the SMPS and the main board to supply power to the display module and control the display module, and the base is configured to be rotatable with respect to the cover so as to have different positions; and
a connection unit to connect the cover and the base,
wherein
the SMPS is disposed on a first side of the base and the main board is disposed on a second side of the base, and
a portion of the connection unit connected to the base is disposed between the SMPS and the main board and includes at least one cable which connects the drive board, SMPS and main board to one another.

14. The display apparatus according to claim 13, wherein the positions of the base comprise:
a stand position in which the base supports the cover below the cover to serve as a stand and a wall mount position in which the base is fixed to a rear of the cover to mount the display apparatus to a wall.

15. The display apparatus according to claim 14, wherein
the connection unit is configured to be hingedly rotatable relative to the cover and the base.

16. The display apparatus according to claim 15, wherein the position of the base is changed from the stand position to the wall mount position by folding the connection unit.

17. A display apparatus comprising:
a display body to display images thereon, the display body comprising:
  a display screen disposed at a front of the display body; and
  a drive board mounted at a rear of the display body disposed opposite the front of the display body;
a base to control images on the display screen, to supply power to the display body through at least one cable unit electrically connected to the drive board, and capable of supporting the display apparatus in a first position substantially perpendicular to the display screen and a second position substantially parallel to the display screen;
a connection unit to rotatably connect the display body with the base, and comprising a cable guide to eliminate twisting of the at least one cable unit, such that the base is configured to support the display apparatus in different positions; and
a detachable neck cover to cover the connection unit while the display apparatus is in the first position.

18. The display apparatus of claim 17, wherein the base in the second position is capable of being mounted to a surface parallel to the display screen.

19. The display apparatus of claim 17, wherein the connection unit lies substantially parallel with the display screen and base while the base is in the second position.

20. The display apparatus of claim 17, wherein the connection unit includes a connection plate and the cable guide is disposed on a top of the connection plate to cover at least a portion of the at least one cable unit.

21. A display apparatus comprising:
a display body comprising:
  a display screen with a first surface to form images; and
  a drive board mounted on a surface of the display screen opposite the first surface;
a base comprising:
  a switching mode power supply (SMPS) to supply power to the display body; and
  a main board to control the display body; and
a connection unit to rotatably connect the base with an external surface of the display body, such that the drive board is electrically connected to the SMPS and the main board by at least one cable, and the base is configured to be rotatable with respect to the display body so as to support the display body in different positions,
wherein
the SMPS is disposed on a first side of the base and the main board is disposed on a second side of the base, and
a portion of the connection unit connected to the base is disposed between the SMPS and the main board and includes the at least one cable which connects the drive board, SMPS and main board to one another.

22. The display apparatus of claim 21, wherein the connection unit further comprises:
a cable guide to eliminate twisting of the at least one cable.

23. The display apparatus of claim 21, wherein the connection unit further comprises:
at least one plate cover to cover an electrical connection between the base and display body.

24. A display apparatus comprising:
a display body having a display panel disposed on a front side of the display body;
a cover to cover the display body;
a base independent of the cover and having a first portion disposed to overlap a first portion of a rear side of the cover, the rear side of the cover being disposed at a rear side of the display body opposite the front side of the display body;
a first coupling unit independent of the cover and fixedly coupling the first portion of the base to the first portion of the rear side of the cover when the base is disposed at the rear side of the cover; and
a second coupling unit to rotatable couple a second portion of the base to a second portion of the cover, and
wherein
the first coupling unit comprises one or more first coupling members to couple the base and the cover, and
when the base is disposed at the rear side of the cover, the base and cover are parallel to one another and the one or more first coupling members are perpendicular to the base and the cover.

25. The display apparatus of claim 24, wherein the second coupling unit is disposed at a center portion of the rear side of the cover in a length direction of the display body.

26. The display apparatus of claim 24, wherein the first coupling unit comprises a plurality of first coupling members disposed opposite to each other with respect to a center line passing a center of the cover and the display body.

27. The display apparatus of claim 24, wherein the second coupling unit comprises a plurality of hinge shafts spaced apart from each other by a distance greater than a first thickness of the base.

28. The display apparatus of claim 24, wherein:
the second coupling unit has an area with a width and a height; and
the height is greater than the width.

29. The display apparatus of claim 24, wherein the first coupling unit comprises:
one or more holes formed on at least one of the first portion of the base and the first portion of the cover into which respective one or more first coupling members protrude into.

30. The display apparatus of claim 24, wherein the base is disposed parallel to the cover of the cover and spaced apart from the rear side of the cover by at least a distance equal to a thickness of the first coupling unit.

31. The display apparatus of claim 24, wherein a front side of the cover covers a front side of the display body and the rear side of the cover covers the rear side of the display body.

32. A television apparatus comprising:
a display body including a display module to display images on a front side of the display body, the display body including a plurality of spacer members with a longitudinal axis thereof extending perpendicularly from a rear side of the display body disposed opposite the front side of the display body;

a cover to cover the display body and including a front side and a rear side;

a base including a control board to transmit video signals to the display module, a front side of the base being directly affixed to the plurality of spacer members to fixedly maintain the base in a spaced relation with respect to the display body when the base is disposed at the rear side of the display body and the television apparatus is mounted on a wall; and a coupling unit independent of the cover and configured to fixedly couple the base to the cover when the base is disposed at the rear side of the cover, the coupling unit comprising one or more coupling members to couple the base and the cover, wherein when the base is disposed at the rear side of the cover, the base and cover are parallel to one another and the one or more coupling members and the plurality of spacer members are perpendicular to the base and the cover, and the base is disposed parallel to the cover and spaced apart from the cover by at least a distance equal to a thickness of the coupling unit.

33. The television apparatus according to claim 32, wherein:

each of the spacer members comprises a cylindrical-shaped body; and the base is fixedly mounted to the display body by inserting a plurality of screws from a rear side of the base and fastening into the respective cylindrical-shaped body of the spacer members.

34. The television apparatus according to claim 32, wherein the base further includes a power supply board to supply power to the display body.

35. The television apparatus according to claim 32, further comprising a connection unit to electrically connect the base and the display body.

\* \* \* \* \*